US011741479B1

(12) United States Patent
Dixon et al.

(10) Patent No.: US 11,741,479 B1
(45) Date of Patent: Aug. 29, 2023

(54) ASSET TRACKER LOSS ALERT AND NOTIFICATION PROCESS

(71) Applicant: United Services Automobile Association, San Antonio, TX (US)

(72) Inventors: David Patrick Dixon, Boerne, TX (US); Wayne Maurice Hartman, San Antonio, TX (US); Gary Scott Harris, Shavano Park, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

(21) Appl. No.: 17/493,139

(22) Filed: Oct. 4, 2021

Related U.S. Application Data (63) Continuation of application No. 14/832,734, filed on Aug. 21, 2015, now Pat. No. 11,195,184.

(60) Provisional application No. 62/050,887, filed on Sep. 16, 2014.

(51) Int. Cl.
*G06Q 40/08* (2012.01)
*G01S 19/13* (2010.01)
*G06Q 30/018* (2023.01)

(52) U.S. Cl.
CPC .......... *G06Q 30/0185* (2013.01); *G01S 19/13* (2013.01); *G06Q 40/08* (2013.01)

(58) Field of Classification Search
CPC ..... G06Q 30/0185; G06Q 40/08; G01S 19/13
USPC .......................................................... 705/4
See application file for complete search history.

(56) References Cited

U.S. PATENT DOCUMENTS

| | | | |
|---|---|---|---|
| 8,140,358 B1 * | 3/2012 | Ling | G07C 5/008 340/439 |
| 8,593,276 B2 * | 11/2013 | Doyle | G08B 21/0236 340/539.11 |
| 9,679,456 B2 | 6/2017 | East | |
| 2010/0097208 A1 * | 4/2010 | Rosing | G06Q 10/087 340/572.1 |
| 2011/0285535 A1 | 11/2011 | Barwin | |
| 2013/0150028 A1 | 6/2013 | Akins et al. | |
| 2014/0066010 A1 * | 3/2014 | Madsen | H04W 12/12 455/410 |
| 2014/0201213 A1 | 7/2014 | Jackson et al. | |

* cited by examiner

*Primary Examiner* — Clifford B Madamba
(74) *Attorney, Agent, or Firm* — Locke Lord LLP; Christopher J. Capelli (57) ABSTRACT

A method for tracking insured assets is provided. Asset identifiers corresponding to assets to be monitored are received from a user. Each of the one or more assets is attached to a tracking device. Monitored assets are covered by one or more insurance policies. One or more geofence regions are defined associated with the one or more monitored assets. A location of each of the monitored assets is estimated, at least periodically. In response to determining that the estimated location of at least one of the monitored assets is outside of the corresponding one or more geofence regions, an insurance policy associated with this at least one asset is determined. A policyholder associated with the insurance policy is notified by sending a notification to policyholder's-preferred device. The notification inquires instructions for remedial actions from the policyholder. One or more remedial actions are initiated based on received policyholder's instructions.

9 Claims, 6 Drawing Sheets

ASSET TRACKER LOSS ALERT AND NOTIFICATION PROCESS

CROSS REFERENCE TO RELATED APPLICATIONS

This application is a Continuation of U.S. patent application Ser. No. 14/832,734 filed Aug. 21, 2015, which claims priority to U.S. Patent Application No. 62/050,887 filed Sep. 16, 2014, which are incorporated herein by reference in its entirety.

FIELD OF THE INVENTION

The present disclosure relates generally to asset tracking, and more particularly, to a loss alert and notification process for assets covered by an insurance policy.

BACKGROUND OF THE INVENTION

Tracking the location and movement of assets can be a valuable undertaking for many owners. Assets of the company, in and of themselves, are often quite valuable and monitoring the location of such assets can be important to prevent theft or unauthorized use of the asset. For example, heavy construction equipment is commonly very valuable. Furthermore, such equipment is frequently moved to new locations and used in construction activities. Such equipment is either owned by a particular construction company or leased from a leasing company. In either case, the owner of the equipment generally desires to have knowledge of the location of such equipment, and also to be notified if the equipment is moved away from a location.

The equipment owner may desire to have such knowledge in the case of an unauthorized use of the asset or theft of the asset. For example, if the equipment owner has leased the equipment to be used at a certain site, movement of the equipment away from that site may indicate that a thief is attempting to steal the equipment. Having the location of the equipment may thus help recover any stolen equipment, or stop a theft that is in progress. This ability helps to reduce the cost of insurance for the company. Numerous other examples exist where it may be desired to track the location of assets for insurance providers.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a computer-implemented method and system for tracking insured assets is disclosed in which provided is one or more asset identifiers corresponding to one or more assets to be monitored wherein each of the one or more assets is attached to a tracking device. The one or more assets is preferably covered by one or more insurance policies. Notification is received from a variety of sources that at least one asset has moved from a predetermined location (e.g., a dwelling, insured property, etc.). An insurance policy is then identified that is associated with the at least one asset. A policyholder associated with the insurance policy is then notified by preferably sending a notification to a policyholder containing instructions for remedial actions from the policyholder regarding the at least one asset such that one or more remedial actions based on received policyholder's instructions may be initiated.

In accordance with another aspect, a computer-implemented method for tracking insured assets is provided. One or more asset identifiers corresponding to one or more assets to be monitored are received. Each of the one or more assets is attached to a tracking device. Monitored assets are covered by one or more insurance policies. One or more geofence regions are defined associated with the one or more monitored assets. A location of each of the monitored assets is estimated, at least periodically. In response to determining that the estimated location of at least one of the monitored assets is outside of the corresponding one or more geofence regions, an insurance policy associated with this at least one asset is determined. A policyholder associated with the insurance policy is notified by sending a notification to policyholder's-preferred device. The notification inquires instructions for remedial actions from the policyholder. One or more remedial actions are initiated based on received policyholder's instructions.

This summary section is provided to introduce a selection of concepts in a simplified form that are further described subsequently in the detailed description section. This summary section is not intended to identify key features or essential features of the claimed subject matter, nor is it intended to be used to limit the scope of the claimed subject matter.

BRIEF DESCRIPTION OF THE DRAWINGS

The accompanying appendices and/or drawings illustrate various non-limiting, examples, inventive aspects in accordance with the present disclosure.

DETAILED DESCRIPTION OF CERTAIN EMBODIMENTS

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

As indicated above, embodiments of the present invention include a method, system, and computer program product that can be used to electronically track assets covered by an insurance policy and to notify a policyholder of unexpected and/or suspicious movements of an insured asset. In some embodiments, asset tracking system described herein is able to obtain policyholder's instructions regarding remedial actions, which may include law enforcement notification of asset loss. This system may interact with a policyholder via a number of notification delivery mechanisms according to policyholder's preferences. Furthermore, such software is able to improve policyholder's financial health and security via reduced insurance costs, such as rates, fees deductibles and other personal expenses associated with theft and replacement of stolen assets.

Figure 1:
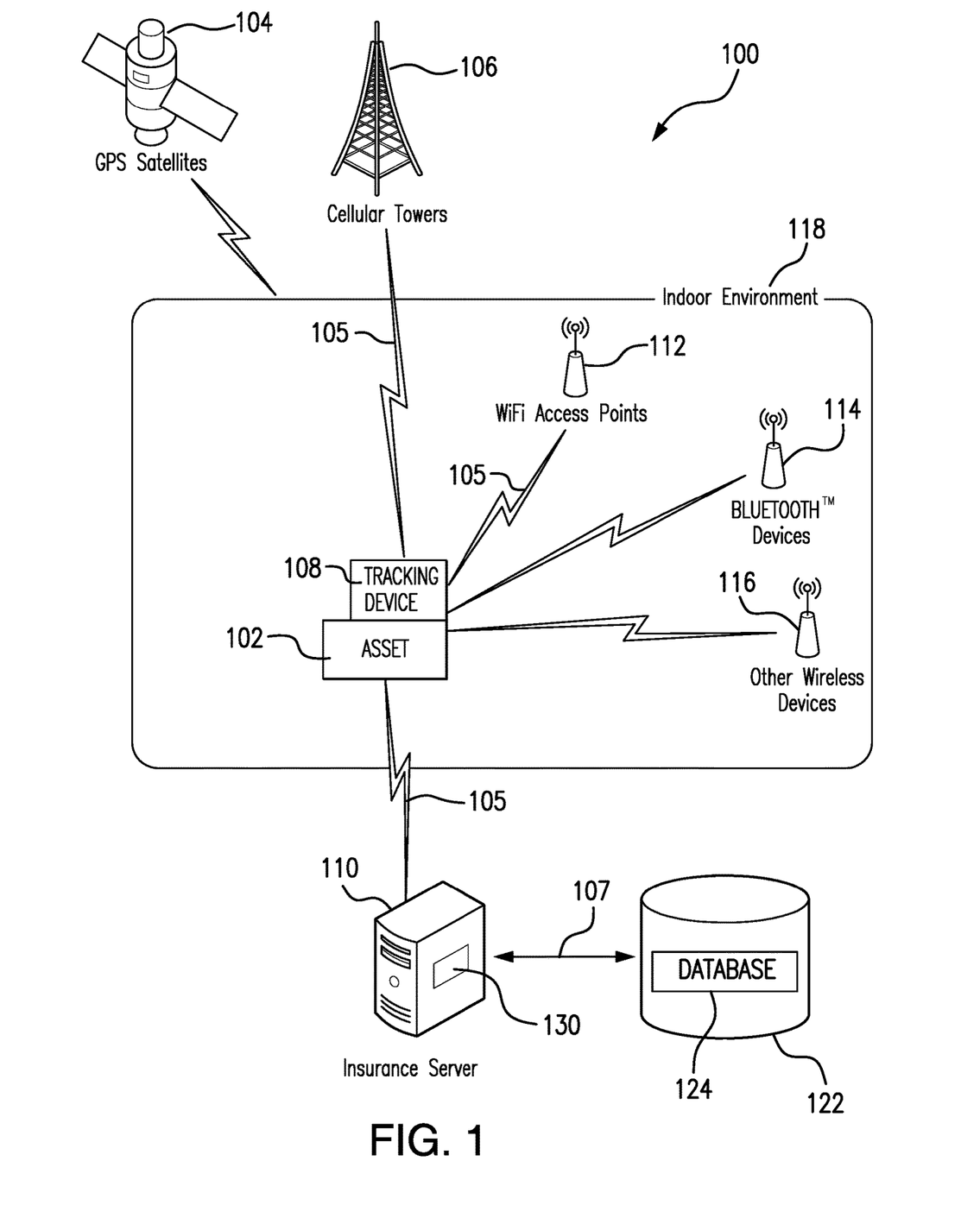
FIG. 1 illustrates an example communication network in accordance with an illustrated embodiment.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

An exemplary communication network 100 depicted in FIG. 1 illustratively comprises nodes/devices 104, 106 and 108-122 (e.g., tracking devices, mobile devices, servers, routers, wireless stations, satellites, and the like) interconnected by various methods of communication. For instance, the links 105 may comprise a wireless communication medium, where certain nodes are in communication with other nodes, e.g., based on distance, signal strength, current operational status, location, etc. The link 107 may be a wired link. Moreover, each of the devices can communicate data packets (or frames) with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity.

FIG. 1 illustrates an exemplary network 100 in which an embodiment of the present invention may be implemented. The network 100 includes a tracking device 108 attached to an asset 102, preferably covered by one or more insurance policies, and an insurance server 110. In some implementations, the asset 102 can include any item capable of being monitored or tracked for insurance related purposes. Examples of assets include, but are not limited to, valuable personal property such as artwork items, moveable safe deposit boxes, purses, luggage, golf bags; valuable electronic equipment such as TVs, computers, laptops; various utility vehicles such as All-Terrain Vehicles(ATVs), boats, motorcycles, trailers, tractors, golf carts and heavy construction equipment. In various embodiments, asset tracking devices 108 may have location sensing capabilities and may have various sizes, power and signal capabilities based on the type of asset 102 desired to be tracked. Examples of tracking devices 108 having built-in signal emitter/tracking mechanism include, but are not limited to, GPS enabled devices, Wi-Fi enabled devices, devices with BLUETOOTH™ capabilities, micro-radio frequency (RF) products for locally monitored geofences, radio beacons, optical signal emitters. Such tracking devices 108 can be attached to monitored assets 102 so as not to be apparent to potential thieves. The asset tracking system disclosed herein may use the tracking device 108 to determine location of the corresponding insured asset 102. The tracking device 108 may enable this by receiving, for example, identifiable RF location signals over a period of time and transmitting the location data to monitoring application, for example, to the insurance carrier's server 110. It is contemplated that the insurance server 110 may have the interaction capabilities with one or more data centers and/or servers belonging to various law enforcement agencies (not shown in FIG. 1) in order to facilitate asset retrieval process by exchanging some information, such as asset location information.

As depicted in FIG. 1, wireless location signals can originate from Wi-Fi access points 112, BLUETOOTH™ devices 114, and/or other RF wireless stations 116, which may include RFID readers, ZIGBEE™ devices, or any such device which emits a wireless signal that helps to determine location of the tracking device 108, if the tracking device 108 is equipped with an appropriate receiver. Collectively, these signal sources will be referred to as "position information sources". At least some of the position information sources 112-116 may be present in the indoor environment 118. The tracking device 108 also may receive signals from cell towers 106 and/or GPS satellites 104. Cellular towers 106 may provide location information using triangulation or other methods known in the art. However, it is challenging to precisely determine tracking device's 108 location based solely on cell phone triangulation. Also, while GPS satellites 104 send signals that may be received by the tracking device 108 while it is outside of the indoor environment 118, GPS signals do not usually effectively reach such devices inside most indoor environments. Therefore, according to an embodiment of the present invention, rather than relying solely on cellular and/or GPS position information sources, an asset tracking application 130, running, for example, on the insurance server 110, may utilize and combine location information received from the plurality of position information sources 104-106 and 112-116 in order to provide more accurate and reliable location information associated with the monitored asset 102.

In addition to monitoring location information and transmitting such information to the asset tracking application 130, the tracking devices 108 may also provide other functions, such as voice communications and data messaging. In one embodiment, the tracking devices 108 monitor their location themselves and make a determination that the asset 102 is located at a predefined site by analyzing the location information. The asset tracking device 108, when it is determined that the asset 102 is at a site, establishes a geofence, and transmits a notification to the asset tracking application 130 if the geofence is broken. The setting of a geofence and the determination that the geofence has been broken are described in more detail below.

Asset tracking application (referred to hereinafter as "asset tracker") 130 may comprise program instructions stored on one or more computer-readable storage devices, which may include internal storage on the insurance server 110. Asset tracker 130 may be, for example, a computer program or program component for monitoring location information of insured assets and for providing an automatic notification to a policyholder if an asset loss is detected or presumed. Data gathered, generated, and maintained for use by the asset tracker 130 may be kept in the internal storage of the insurance server 110 or in one or more databases 124 of a storage unit 122.

According to an illustrative embodiment shown in FIG. 1, the asset tracker application 130 may be implemented in a client-server system environment. In such a case, policyholders may interact with a user interface, such as GUI, on their mobile devices and/or computers (a client device), and the GUI on the mobile device/computer may communicate with the tracker application 130 running on one or more insurance servers 110, for example, over the network link 107. Furthermore, policyholders may receive asset loss notifications on their preferred mobile device and/or computer, as described below.

Figure 2:
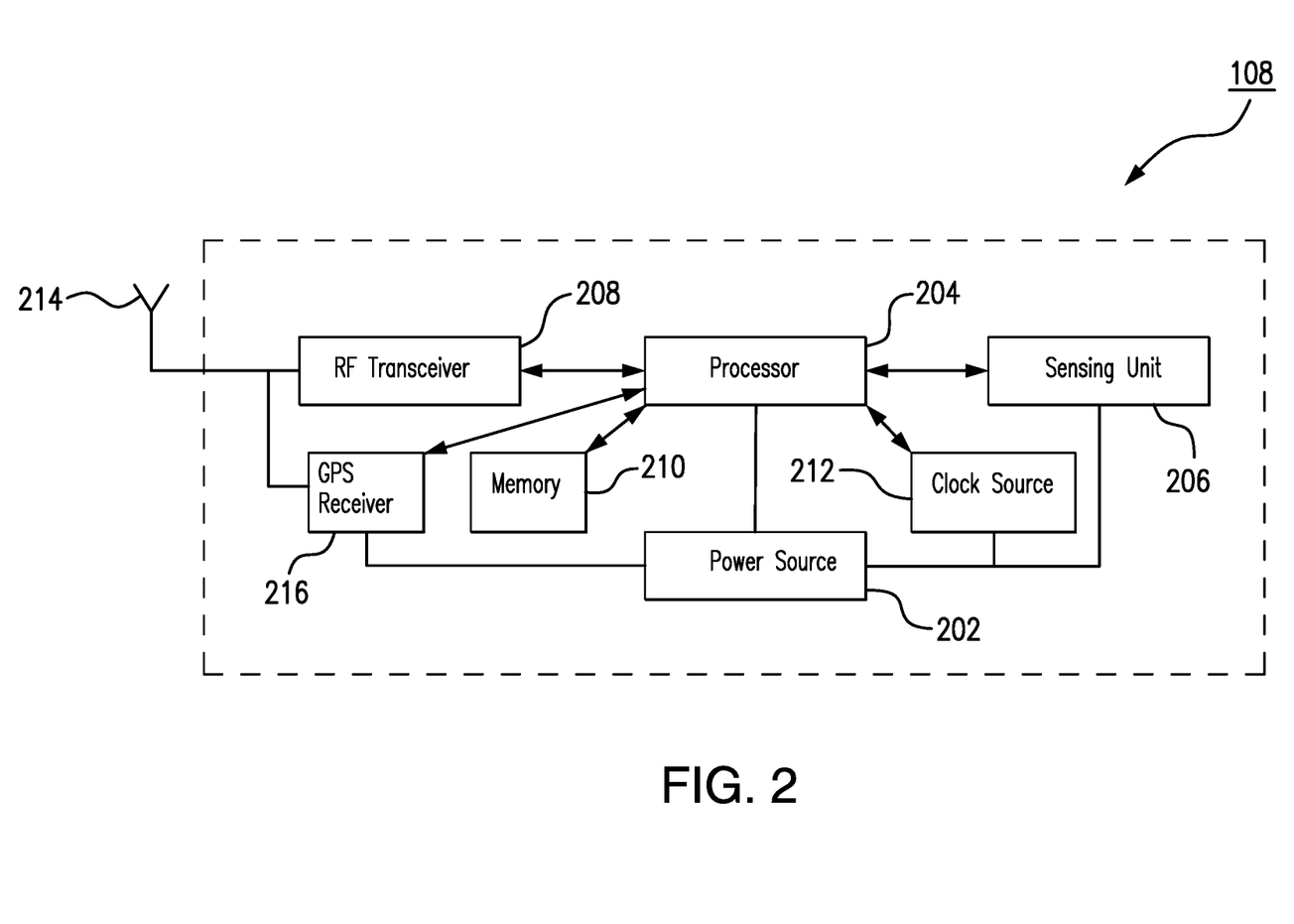
FIG. 2 illustrates a block diagram of the electronic components of a tracking device of FIG. 1 in accordance with an illustrated embodiment of the present invention.

Referring now to FIG. 2, an embodiment of an asset tracking device 108 is shown that includes circuitry and components that are typical of many such devices. It can be seen that the tracking device 108 has a power source 202 for energizing a processor 204, a clock source 212, a sensing unit 206, a memory 210 and a RF transceiver 208 and a GPS receiver 216, which communicate with an antenna 214.

The power source 202 may be any of numerous types of stand-alone electrical power sources. For example, the power source 202 may include one or more batteries and appropriate signal conditioning circuitry or it may be a thermoelectric power source, or it may be a vibration-powered generator that converts mechanical power to electrical power. In a particular example, the power source 202 is implemented as a battery.

The processor 204 may be any one of numerous known general purpose processors or an application specific processor that operates in response to program instructions. Such program instructions may be stored in the memory 210. In addition to the memory 210, the processor 204 may be coupled to other components of the tracking device 108. The processor 204 controls operations of the tracking device 108 including operating any applications that are running on the tracking device 108. The processor 204 could comprise more than one distinct processing device, for example to handle different functions within the tracking device 108.

The memory 210 can be any form of memory device, for example, volatile or non-volatile memory, solid state storage device, magnetic device, and the like. It will be appreciated that the memory 210 may include either, or both, RAM (random access memory) and ROM (read only memory). It will be further appreciated that the memory 210 could be integrally formed as part of the processor 204. The memory 210 may include code to run the different applications for the tracking device 108.

In one embodiment, the tracking device 108 may operate in multiple power saving modes. For example, the tracking device 108 may be activated by a sensing unit 206, such as a motion detection switch, which, when displaced from its original position, causes electrical current from the internal power source 202 to activate a location determination process, which may compare current position of the tracking device 108 against defined geofences, as described below. The sensing unit 206 may include, for example, one or more motion sensors and appropriate signal conditioning circuitry. In some embodiments, multiple sleep and awake modes (power saving modes) may be utilized to increase life of the power source 202. Switching from a full run mode through a succession of reduced power modes may be carried out based upon specified timeout conditions and/or based on any movement detected by the sensing unit 206.

The processor 204, implementing appropriate processing software described below, may supply the location data to the RF transceiver 208 via, for example, transceiver I/O, which may be implemented in either software, hardware, or a combination of both. The RF transceiver 208 may modulate and transmit the asset location data to the asset tracker 130, as commanded and controlled by the processor 204 and/or programming instructions being executed by the processor 204. The processor 204 may also implement various other command and control functions, some of which are based on data received from the RF transceiver 208.

The RF transceiver 208 may be implemented using any of numerous transceiver configurations, and in the depicted embodiments may include an I/O interface, an RF transmitter, and an RF receiver. As previously indicated, the I/O interface may function to provide control and data transfer between the processor 204 and the RF transceiver 208. The I/O interface, in response to commands from the processor 204, may control the overall functionality of the RF transceiver 208. For example, the I/O interface may configure the RF transceiver 208 to either transmit data or receive data. In some embodiments, the I/O interface may also control, among other things, the operating frequency, transmission power, and reference frequency of the RF transceiver 208.

The RF transmitter may receive data from the I/O interface, may modulate the data and, when commanded to do so by the I/O interface, may transmit the RF modulated data, via the RF antenna 214, to the asset tracker 130. The RF transmitter can be configured to implement any one of numerous types of RF modulation schemes, including for example, QPSK (Quaternary Phase Shift Key). The RF transmitter may additionally be configured to implement any one of numerous types of multiple access schemes including, but not limited to, fixed-frequency radio transmission, Time Division Multiple Access (TDMA), Frequency Division Multiple Access (FDMA), Code Division Multiple Access (CDMA), Direct Sequence Spread Spectrum (DSSS) radio transmission, Frequency Hopping Spread Spectrum (FHSS) or Orthogonal frequency-division multiplexing (OFDM).

The RF receiver, in response to commands from the I/O interface may receive RF modulated data from the asset tracker 130, via the antenna 214. The RF receiver may demodulate the received RF modulated data and may supply the demodulated data to the I/O interface.

The RF transceiver 208 may be implemented using discrete components, integrated circuit components, or a combination thereof, and to operate at any one, or multiple, frequencies in the RF spectrum. Moreover, if implemented using an integrated circuit, the RF transceiver 208 may be any one of numerous known transceiver integrated circuits or an application specific integrated circuit.

In one embodiment, the asset tracking device 108 may include position sensing receivers that are capable of providing the location of the tracking device 108, and thus also capable of providing the location of the associated asset 102. In this embodiment, the position sensing receivers may include GPS receivers 216 that receive signals from various GPS satellites 104. As is understood in the art, the GPS receiver 216 operates to provide location information to a relatively high degree of accuracy by performing well known trilateration algorithms based on signals from several GPS satellites 104. The GPS receiver 216 is also connected to the antenna 214. The antenna 214, while illustrated in FIG. 2 as a single antenna, may include one or more separate antennas, such as a separate antenna for the GPS receiver 216, a send antenna, and/or a receive antenna.

In an exemplary embodiment, the tracking device 108 may optionally further include a clock source 212. The clock source 212 may include a system clock circuit. The clock source 212 may also include time and date capabilities such as a Real Time Clock (RTC) and at least one timeout unit for evaluating timers or timeout conditions, in response to instructions received from the processor 204. It is noted that in various embodiments, the tracking device 108 may be configured and operable to include additional features and functions, such as, for example, but not limited to, low-power signal capabilities and user interface capabilities.

As previously indicated, in some embodiments of the present invention geofences can be used in conjunction with location-aware tracking devices 108 to detect a specific location of the asset 102 being monitored. Geofences can be defined in terms of GPS coordinates (e.g., latitude and longitude) combined with a radius measured in meters or feet, for example. Alternatively, geofences can also be defined according to a series of GPS coordinates defining a bounding box. In yet other examples, a geofence can be any geometric shape defined by a mathematical formula and anchored by a GPS coordinate.

Figure 3:
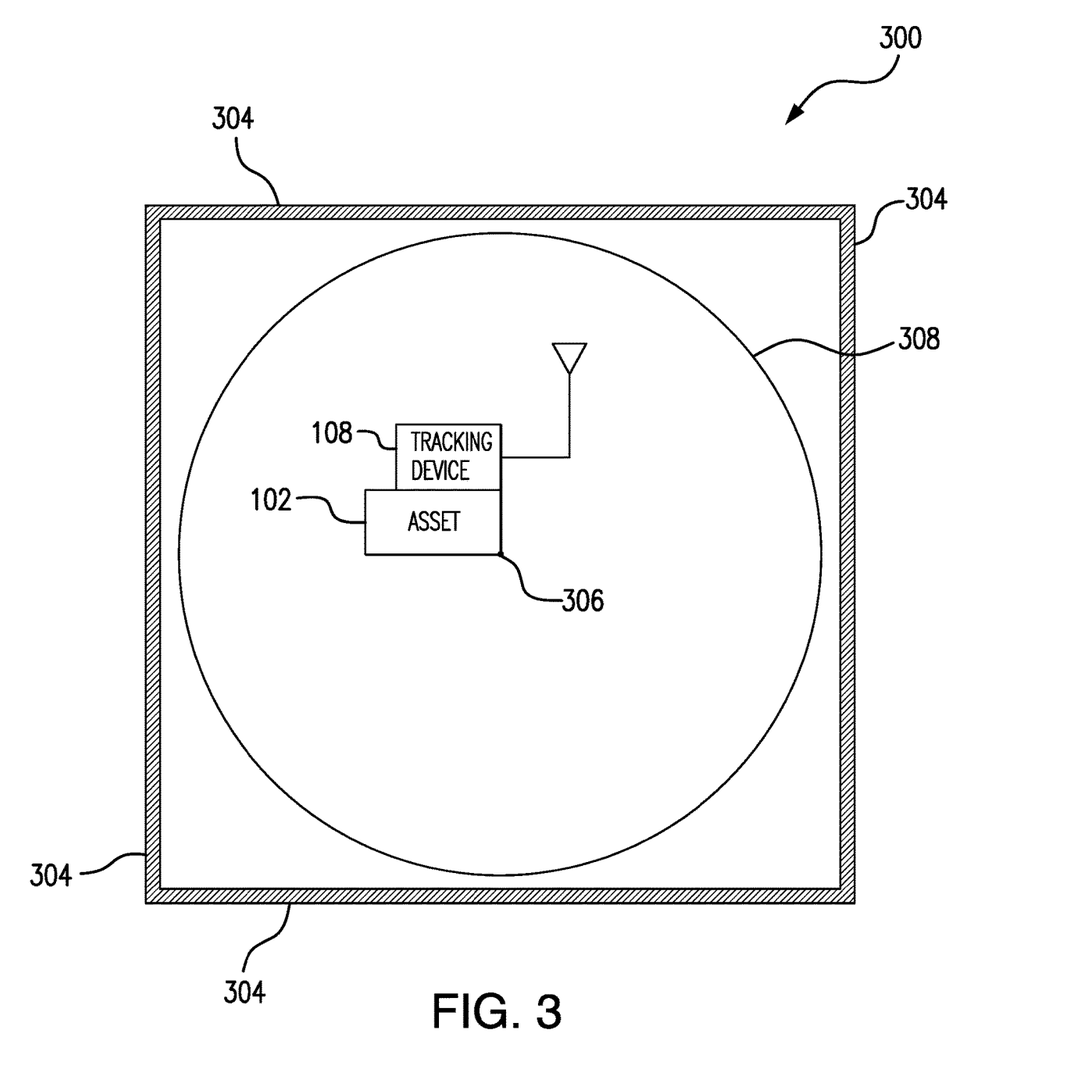
FIG. 3 is an illustration of an asset in relation to a site and a geofence boundary for various embodiments of the present invention.

Referring now to FIG. 3, the asset 102 and associated tracking device 108 are generally illustrated in and around a site 300. The site 300 includes a site boundary 304 illustrated with cross-hatching. The site boundary 304 is the physical location of the edges of the particular site 300 that may be defined using, for example, latitude and longitude coordinates. For example, the site 300 may be policyholder's local property, residence, farm, ranch, business location and the like. In such cases, a survey may have been made of the site 300 that identifies the site boundary 304 to a high degree of accuracy. When such boundary coordinates are available to asset tracker 130, they may be used to establish a geofence for an asset 102 that is to be monitored at the site 300. While such coordinates may be used to provide a relatively accurate geofence boundary for a particular asset, programming such a geofence can be resource intensive. In many instances, asset location monitoring may be effectively accomplished using relatively rough estimates of the site boundary, and thus resources to program a precise geofence may not be needed in many cases.

In one embodiment, the tracking device 108 may operate to monitor the location provided by the GPS receiver 216 continuously or near continuously Once the asset tracking device 108 determines the current location coordinates of the corresponding asset 102, it may transmit these coordinates to the asset tracker 130. The asset tracker 130 in turn may use these coordinates to establish a geofence. In the example of FIG. 3, the asset 102 has location coordinates defined by the coordinates of point 306. The geofence boundary is then established based on the current location, and is illustrated in FIG. 3 by circle 308. The geofence boundary 308, in this embodiment, is set to be a preset radius from point 306. However, in other embodiments the determination of location 306 and the establishment of boundary 308 may be performed dynamically. Even though in FIG. 3 geofence 308 has a circular shape, it is noted that geofence 308 can be any geometric shape. If the asset 102 moves beyond the geofence boundary 308, the tracking device 108 may transmit a message to the asset tracker 130 that the asset 102 is no longer located at the site 300.

Figure 4:
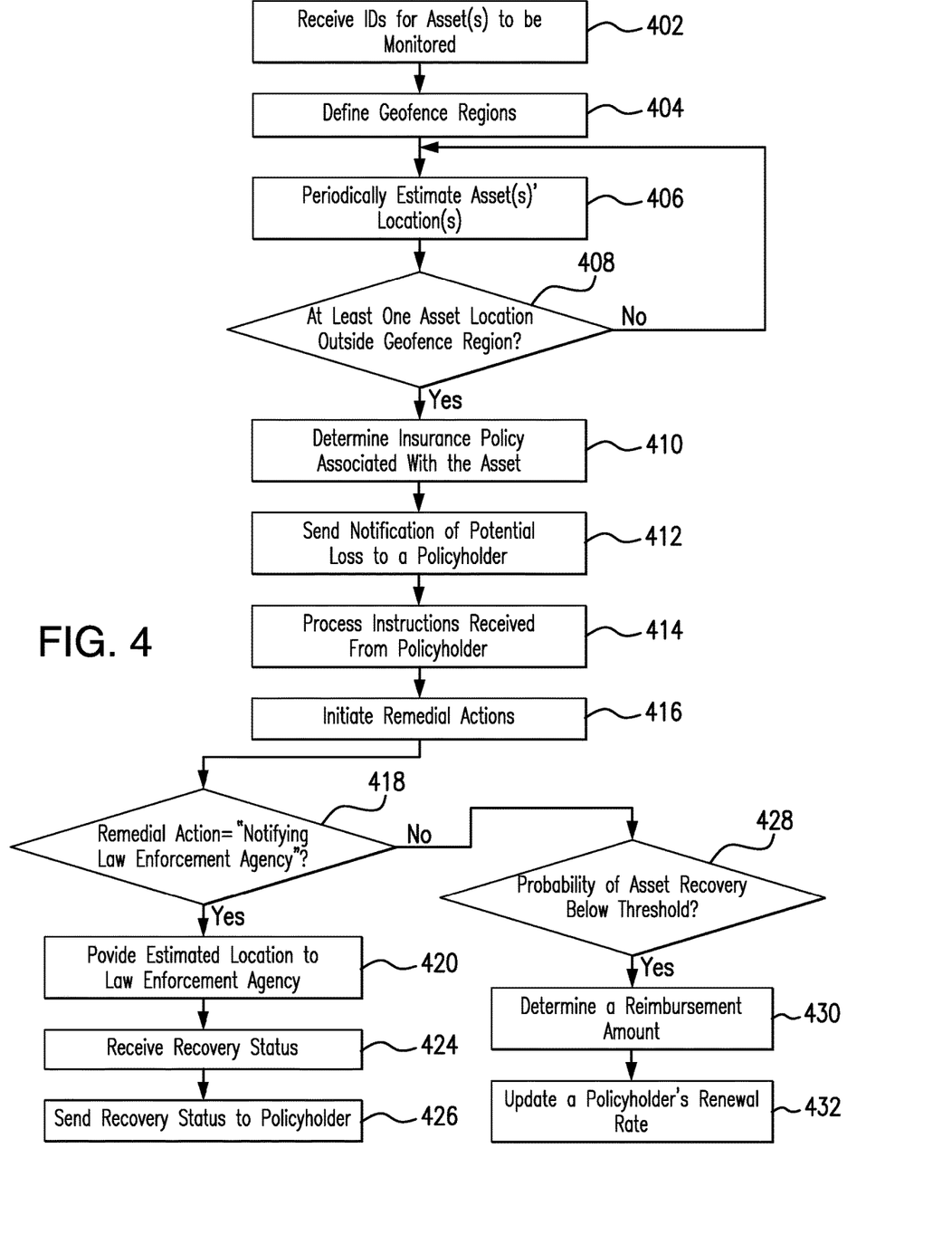
FIG. 4 is a flowchart of operational steps of the asset tracker module of FIG. 1 in accordance with an exemplary embodiment of the present invention.

FIG. 4 is a flowchart of operational steps of the of the asset tracker module of FIG. 1 in accordance with an exemplary embodiment of the present invention. Before turning to description of FIG. 4, it is noted that the flow diagram shown therein is described, by way of example, with reference to components shown in FIGS. 1-3 and 6, although these operational steps may be carried out in any system and are not limited to the scenario shown in the aforementioned figures. Additionally, the flow diagram in FIG. 4 shows examples in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

As previously indicated, in certain embodiments of the present invention the asset tracker 130 may be configured and operable to monitor location information of insured assets and to provide automatic notifications to policyholders if their assets are presumed to be lost or stolen. In some embodiments, the asset tracker 130 may include at least one component (i.e., GUI) which may operate as an application on policyholder's mobile device. The GUI component of the asset tracker 130 may enable a policyholder to enter information related to one or more assets desired to be monitored and covered by an insurance policy. In one embodiment, each asset 102 may be associated with a unique identifier (such as an asset ID) that uniquely identifies the asset 102. The unique asset ID may include characters, such as numbers, letters, symbols, and/or the like.

Referring to FIG. 4, at 402, the asset tracker 130 may receive a request to monitor one or more assets 102. In one embodiment, such request may specify the one or more assets to be monitored and their corresponding asset IDs. In some embodiments, the asset tracker 130 may have a capability to generate and assign unique IDs to one or more assets 102 if this information is not provided by a policyholder. This step may further require the asset tracker 130 to associate provided/generated asset IDs of one or more assets 102 with corresponding tracking devices 108 attached to the one or more assets 102. Once the asset tracker 130 determines a set of tracking devices 108 for carrying out the asset location monitoring process, the asset tracker 130 may initiate communication with this set of tracking devices 108 in order to obtain current location coordinates of each tracking device 108.

In many embodiments, asset location monitoring may be effectively accomplished by using geofences. Accordingly, the initial request to monitor one or more assets 102 may include location information related to the site 300 at which the asset 102 should be monitored. The site 300 may be policyholder's local property, residence, farm, ranch, business location, and/or the like. In one embodiment, the initial request to monitor may include coordinates that may be used by the asset tracker 130 to establish a boundary of a corresponding geofence. In one embodiment, the asset tracker 130 may define the geofence boundary as a preset radius from a point, such as point 306 in FIG. 3, the coordinates of which may be provided by a policyholder. In addition, a policyholder may indicate whether the asset to be monitored 102 is expected to be stationary or in motion. If the asset 102 comprises a vehicle, such as an ATV, a boat, a motorcycle or a tractor, the asset tracker 130 may request additional information related to common routes/common destination locations, which may be designated by the asset tracker 130 as "safe zones". This type of designation may enable the asset tracker 130 to reduce the possibility of false alarms and to prevent improper loss notifications. In addition to safe zones, at 404, the asset tracker 130 may establish user-configurable rules for asset movement within the designated safe zones and/or within one or more established geofences. Violation of such rules may be utilized by the asset tracker 130 as a trigger for transmitting a notification of potential asset loss to a policyholder, as described below.

At 406, the asset tracker 130 may start monitoring the location/movement of one or more assets 102 on continuous or nearly continuous bases. In one embodiment, the asset tracker 130 may request, at least periodically, asset location information (e.g., GPS coordinates) from the associated tracking devices 108. Based on the received coordinates, the asset tracker 130 may estimate asset(s) 102 location(s) and may determine whether such location is within the defined geofence (or safe zone) and that the estimated location does not violate asset movement rules, if such rules are provided by a policyholder. It is noted that in an alternative embodiment, at least some of the tracking devices 108 may be enabled to monitor asset location/movement by themselves if the asset tracker 130 is configured to share information related to established geofences, safe zones, asset movement rules with the tracking devices 108. In such embodiments step 406 may be continuously performed by the tracking devices 108 rather than the asset tracker 130. In various embodiments, asset movement can be monitored by the tracking devices 108 via ongoing signals and/or pulses for range and/or geofence location checks.

At 408, the asset tracker 130 preferably determines whether any of the estimated locations for any of the monitored assets 102 are outside the corresponding geofences. In addition, at 408, the asset tracker 130 may determine whether movements of any tracked assets 102 violate user-configurable movement rules outside of the approved safe zones within the corresponding geofences. If the asset tracker 130 determines that all monitored assets 102 are located at the expected positions (step 408, no branch), the asset tracker 130 may return to the monitoring step 406.

In response to determining that at least one asset location is outside a corresponding geofence region and/or in response to detecting a violation of the abovementioned asset movement rules (step 408, yes branch), at 410, the asset tracker 130 may determine the insurance policy covering the potentially stolen asset(s) based, at least in part, on corresponding one or more asset IDs. In one embodiment, the asset tracker 130 may identify the insurance policy, for example, by querying one or more databases 124 of the storage unit 122 (shown in FIG. 1). It is noted that in various embodiments the insurance policy may comprise, without limitations, homeowner's insurance policy, automotive insurance policy, renter's insurance policy, business insurance policy, valuable personal property insurance policy, umbrella insurance policy, or the like. At least in some embodiments, the identified policy may be associated with policyholder's preferences with respect to notifications indicative of a potential asset loss. Such preferences may include, but not limited to preferred target mobile device/computer and/or preferred notification delivery format. The notification formats may include, but not limited to, Short Message Service (SMS) messages, instant messages, email messages, application pop-up alerts, flashing indicators, audible alerts, phone calls, and the like.

Figure 6:
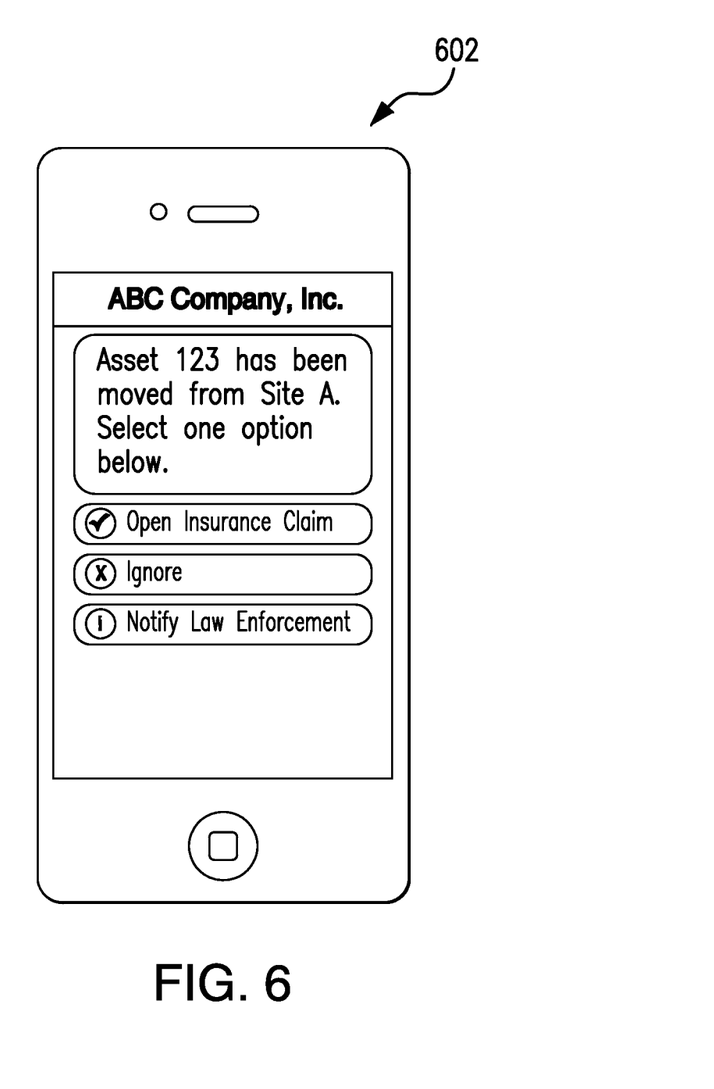
FIG. 6 depicts a device of a policyholder receiving asset loss notification, according to an embodiment of the present invention.

At 412, the asset tracker 130 may generate and transmit in real time a notification to one or more policyholders in accordance with the predefined policyholders' preferences. Such notification may be indicative of a potential loss/theft of an insured asset. Advantageously, the notification generated at step 412 may inquire instructions for remedial actions from the notified policyholders. Example of the notification is shown in FIG. 6 and may include a verbal description of the asset movement beyond the geofence boundary and/or description of other asset movement violation. For instance, the asset tracker 130 may send such notification to the policyholder's mobile device 602 in a text message, such as SMS text. In addition, the notification generated at 412 may request policyholder's authorization/instructions to initiate one or more remedial actions. The nature of the authorization may depend on how the notification was delivered (notification delivery format) and on the policyholder's device 602 that receives the notification. For example, if the notification was sent by the asset tracker 130 as a voice message to the device 602 such as a phone, then policyholders may reply by entering a predetermined code, which corresponds to one or more predetermined remedial actions. The predetermined code may include one or more entries on the phone keypad of numbers (0-9), symbols (*, #), or combinations of both. In various embodiments, policyholders may also provide verbal instructions, such as by saying "Ignore", for example. If the notification was sent as a text message to the policyholder's device 602, then the policyholder may reply by sending a text message back that includes the predetermined code. If the asset tracker 130 sent the notification to a software application (shown in FIG. 6) on the policyholder's mobile device 602, then the policyholder may reply by selecting a "Notify Law Enforcement" or "Open Insurance Claim" indicator that is part of the software application. Of course, it should be noted that the remedial action options shown in FIG. 6 are set forth for illustrative purposes only, and thus should not be construed as limiting in any manner.

Next, at 414, the asset tracker 130 may process policyholder's reply indicative of a desired remedial action. In various embodiments, such policyholder's reply may include, but not limited to, a text message, an email message, a voice command, a policyholder's menu selection, wherein such menu options are presented via a software application on the policyholder's mobile device 602 (shown in FIG. 6), and the like. At 416, the asset tracker 130 may initiate one or more remedial actions based on the policyholder's instructions/authorization processed at step 414. For instance, if a policyholder selected an "Open Insurance Claim" indicator shown in FIG. 6, in response, the asset tracker 130 may cooperate with one or more additional processes running on the insurance server 110 to open a new insurance claim for a lost/stolen asset 102. As another example, if a policyholder selected an "Ignore" option shown in FIG. 6, in one embodiment, the asset tracker 130 may consider the potential loss notification generated at 412 to be a false alarm and may return to step 406 to continue monitoring other assets, for example.

It is noted that in some embodiments policyholders may have an option of sending a notification related to an asset theft to one or more designated notification recipients based on legally activated agreements. A designated notification receiver may, in one embodiment, include one or more of law enforcement agencies. Accordingly, in one embodiment, the asset tracker 130 may be configured to exchange information with one or more law enforcement agency servers (not shown in FIG. 1). At 418, the asset tracker 130 may determine whether any of the policyholder's selected remedial actions included a law enforcement agency notification. If so (step 418, yes branch), at 420, the asset tracker 130 may notify one or more predetermined law enforcement agencies of suspected asset theft. In addition to such notification, the asset tracker 130 may transmit latest information related to estimated location of the allegedly stolen asset 102 received from the corresponding tracking device 108. At least in some embodiments, the asset tracker 130 may be configured to provide continuous real-time location feeds to the aforementioned law enforcement agency, which may assist the law enforcement agency in asset recovery.

In some embodiments, policyholders may be interested in receiving real-time notifications indicative of asset recovery status. In such embodiments, at 424, the asset tracker 130 may receive recovery status from the one or more law enforcement agency servers. For example, such servers may send an alert to the asset tracker 130 when the stolen asset 102 is successfully recovered. In response, at 426, the asset tracker 130 may send a corresponding retrieval notification to the policyholder's mobile device 602.

It is noted that in various embodiments, the asset tracker 130 may perform a variety of operations related to insurance policy covering valuable assets, such as asset 102. For example, if the policyholder did not authorize law enforcement notification (step 418, no branch) and/or if the one or more law enforcement agencies have not sent a retrieval alert within a predetermined period of time after the detected loss/theft of the asset 102, at 428, the asset tracker 130 may calculate a probability of asset recovery based, at least in part, on whether the asset tracker 130 remains in wireless communication with the tracking device 108 associated with the insured asset 102, based on estimated location of the insured asset 102 and based on historical asset recovery information, which may be stored in one or more databases 124 of the storage unit 122 (shown in FIG. 1).

In one embodiment, in response to determining that the calculated probability of asset recovery is below a predetermined threshold (if there is no reasonable expectation of recovery) (step 428, yes branch), at 430, the asset tracker 130 may determine a reimbursement amount associated with the loss/theft of the insured asset 102 based on, for example, the terms of the insurance policy identified at step 410. In one embodiment, the reimbursement amount may depend on actual cash value of the asset 102 covered by the corresponding insurance policy. At 432, the asset tracker may update policyholder's renewal rate based, at least in part, on the insurance reimbursement amount.

It is noted that steps 428-432 are described above for illustrative purposes only and are not meant to limit the present invention. It is further noted that although embodiments of asset tracking system described herein will typically be implemented in a network environment between a policyholder's mobile device 602 and the asset tracker module 130 running on a remote server operated, for example, by an insurance company or another monitoring entity, some of the embodiments can also be applied to local asset tracker applications 130 running exclusively on policyholder's mobile devices as well.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
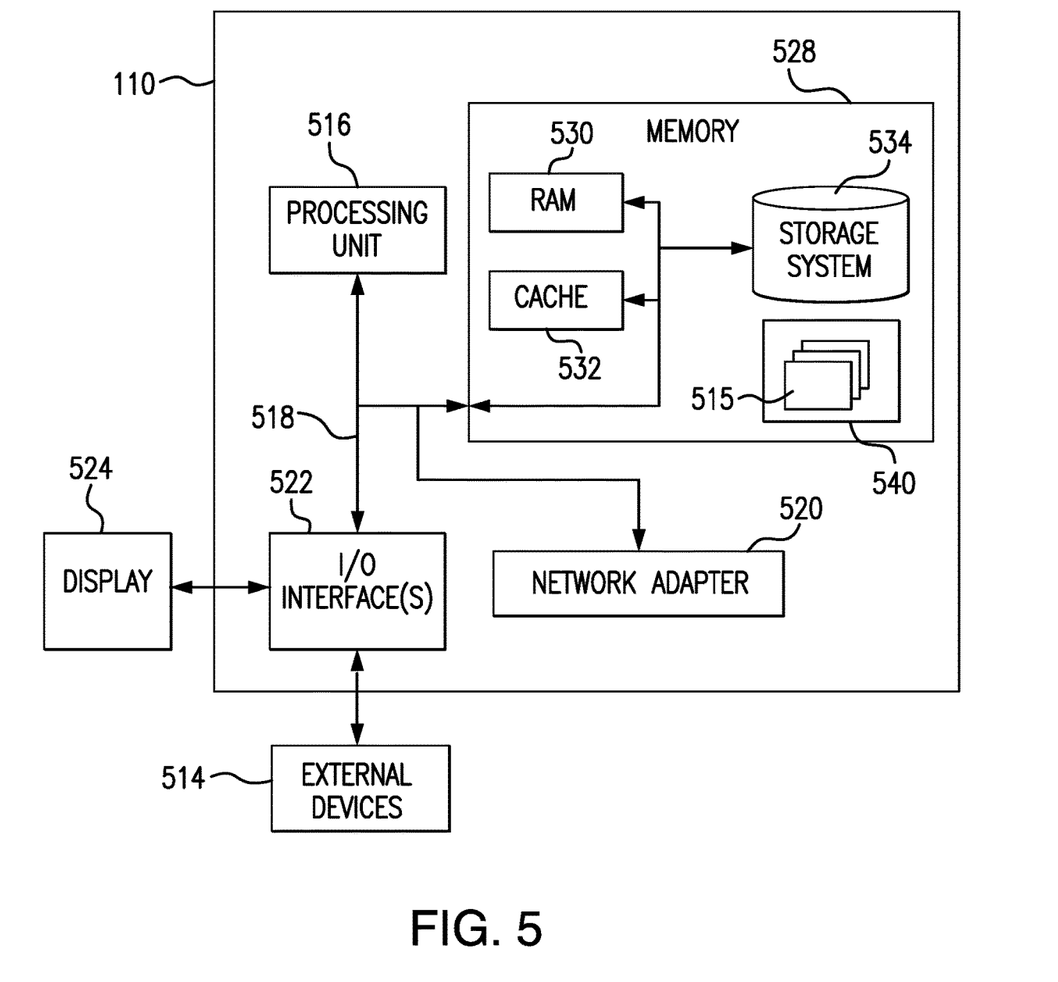
FIG. 5 illustrates a typical computing system that may be employed to implement at least some processing functionality in accordance with an exemplary embodiment of the present invention.

FIG. 5 is a schematic block diagram of an example computing device 110 (shown in FIG. 1) that may be used (or components thereof) with one or more embodiments described herein, e.g., as the insurance server 110 shown in the network 100. As explained above, in different embodiments this computing device 110 is configured to communicate with other devices in any suitable way, such as, for example, via communication network 100.

Device 110 is intended to represent any type of computer system capable of carrying out the teachings of various embodiments of the present invention. Device 110 is only one example of a suitable system and is not intended to suggest any limitation as to the scope of use or functionality of embodiments of the invention described herein. Regardless, computing device 110 is capable of being implemented and/or performing any of the functionality set forth herein.

Computing device 110 is operational with numerous other general purpose or special purpose computing system environments or configurations. Examples of well-known computing systems, environments, and/or configurations that may be suitable for use with computing device 110 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 110 may be described in the general context of computer system-executable instructions, such as program modules, being executed by a computer system. Generally, program modules may include routines, programs, objects, components, logic, data structures, and so on that perform particular tasks or implement particular abstract data types. Computing device 110 may be practiced in distributed data processing environments where tasks are performed by remote processing devices that are linked through a communications network. In a distributed data processing environment, program modules may be located in both local and remote computer system storage media including memory storage devices.

Device 110 is shown in FIG. 5 in the form of a general-purpose computing device. The components of device 110 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 110 typically includes a variety of computer system readable media. Such media may be any available media that is accessible by device 110, and it includes both volatile and non-volatile media, removable and non-removable media.

System memory 528 can include computer system readable media in the form of volatile memory, such as random access memory (RAM) 530 and/or cache memory 532. Computing device 110 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 515, such as asset tracker 130 described above, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the invention as described herein.

Device 110 may also communicate with one or more external devices 514 such as a keyboard, a pointing device, a display 524, etc.; one or more devices that enable a user to interact with computing device 110; and/or any devices (e.g., network card, modem, etc.) that enable computing device 110 to communicate with one or more other computing devices. Such communication can occur via Input/Output (I/O) interfaces 522. Still yet, device 110 can communicate with one or more networks such as a local area network (LAN), a general wide area network (WAN), and/or a public network (e.g., the Internet) via network adapter 520. As depicted, network adapter 520 communicates with the other components of computing device 110 via bus 518. It should be understood that although not shown, other hardware and/or software components could be used in conjunction with device 110. Examples, include, but are not limited to: microcode, device drivers, redundant processing units, external disk drive arrays, RAID systems, tape drives, and data archival storage systems, etc.

FIG. 5 is intended to provide a brief, general description of an illustrative and/or suitable exemplary environment in which embodiments of the above described present invention may be implemented. FIG. 5 is exemplary of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. An asset tracking electronic device wirelessly coupled to an asset tracking server for detecting loss of an asset and enabling remedial actions on a remote user cellular device regarding the loss of the asset, comprising:
  a location sensor co-located with the asset for determining the location of the asset wherein the asset is assigned an ID associated with an insurance policy covering the asset;
  a processor, coupled to the location sensor, for determining a geofence for the asset and determining when the asset has moved outside of the geofence such that a wireless signal is sent to an asset tracking server, whereby the asset tracking server is configured to:
    determine an insurance policy for the asset contingent upon the ID of the asset determined to have moved outside of the geofence;
    determine a probability of recovery for the asset based at least in part on whether a location sensor stays in communication with the asset tracking server, and the location of the asset when it was determined to have moved outside of the geofence; and
    instruct a single GUI to be generated on the remote user cellular device indicating a first user selectable indicator to enable user interaction with the GUI of the cellular device to initiate an insurance claim for the identified stolen asset, and a second user selectable indicator to enable user notification to a law enforcement agency regarding the asset determined stolen wherein the second user selectable indicator is separate from the first user selectable indicator on the GUI of the user's cellular device.

2. The asset tracking electronic device as recited in claim 1 wherein instructing a single GUI to be generated on the remote user cellular device further includes indicating identification of the asset determined to have moved outside the geofence.

3. The asset tracking electronic device as recited in claim 2 wherein instructing a single GUI to be generated on the remote user cellular device further includes identification of the location the asset has been moved from.

4. The asset tracking electronic device as recited in claim 1, wherein the asset tracking server is further configured to provide real-time notification to the user cellular device regarding a status update concerning retrieval of the asset determined to have moved outside the geofence.

5. The asset tracking device as recited in claim 1, wherein the processor is further configured to determine that the asset is located at a location based, at least in part, on passage of a period of time during which the rate of movement of the asset has remained at or below a preset threshold.

6. The asset tracking device as recited in claim 5, wherein the geofence is established based on movement of the asset relative to the location during the period of time.

7. The asset tracking device as recited in claim 1, further including: a RF transceiver; a sensing unit; a GPS receiver; and a memory having instructions for enabling wireless communication with the asset tracking server.

8. The asset tracking device as recited in claim 1, wherein the asset tracking server is further configured to initiate an insurance claim for the asset based on instructions entered by a policyholder via the GUI generated on the user's cellular device.

9. The asset tracking device as recited in claim 8, wherein the insurance policy comprises one of: homeowner's insurance policy, automotive insurance policy, renter's insurance policy, business insurance policy, valuable personal property insurance policy and umbrella insurance policy.

\* \* \* \* \*